United States Patent
Fekete et al.

(10) Patent No.: US 10,013,359 B2
(45) Date of Patent: Jul. 3, 2018

(54) REDUNDANT DISK ARRAY STORAGE SYSTEM AND METHOD USING HETEROGENEOUS DISKS AND A LOOKUP TABLE

(71) Applicant: University of New Hampshire, Durham, NH (US)

(72) Inventors: András Krisztián Fekete, Fremont, NH (US); Elizabeth Varki, Lee, NH (US)

(73) Assignee: University of New Hampshire, Durham, NH (US)

( * ) Notice: Subject to any disclaimer, the term of this patent is extended or adjusted under 35 U.S.C. 154(b) by 215 days.

(21) Appl. No.: 14/974,429

(22) Filed: Dec. 18, 2015

(65) Prior Publication Data
US 2016/0188487 A1    Jun. 30, 2016

Related U.S. Application Data

(60) Provisional application No. 62/096,586, filed on Dec. 24, 2014.

(51) Int. Cl.
*G06F 3/06*    (2006.01)
*G06F 12/10*    (2016.01)
*G06F 12/1009*    (2016.01)

(52) U.S. Cl.
CPC .......... *G06F 12/1009* (2013.01); *G06F 3/064* (2013.01); *G06F 3/0607* (2013.01); *G06F 3/0689* (2013.01); *G06F 2212/1044* (2013.01)

(58) Field of Classification Search
CPC .. G06F 12/1009; G06F 3/0607; G06F 3/0635; G06F 3/064; G06F 3/0689; G06F 2212/1044
See application file for complete search history.

(56) References Cited

U.S. PATENT DOCUMENTS

| | | | | |
|---|---|---|---|---|
| 5,696,934 A | * | 12/1997 | Jacobson | .............. G06F 3/0601 711/E12.014 |
| 5,754,756 A | * | 5/1998 | Watanabe | ........... G06F 11/1076 711/114 |
| 6,742,019 B1 | * | 5/2004 | Dan | .................... G06F 12/0888 348/E5.008 |

(Continued)

OTHER PUBLICATIONS

PCT Search Report and Written Opinion for PCT Application No. PCT/US16/60232, dated Mar. 27, 2017, 10 pages.

(Continued)

*Primary Examiner* — Glenn Gossage
(74) *Attorney, Agent, or Firm* — Finch & Maloney PLLC

(57) ABSTRACT

A redundant disk array method includes allocating identically sized logical blocks of storage units together to form a stripe on each of several data storage devices, at least two of the logical blocks in the stripe being located on different data storage devices, generating a lookup table representing a mapping between a logical location of each logical block in the stripe and a physical location of the respective logical block on the corresponding data storage device, and writing data to the physical locations of each logical block in the stripe, the physical locations being obtained from the lookup table. In some cases, at least two of the data storage devices are heterogeneous, and at least two of the data storage devices have a different total number of logical blocks.

20 Claims, 9 Drawing Sheets

(56) References Cited

U.S. PATENT DOCUMENTS

| | | | | |
|---|---|---|---|---|
| 7,447,837 | B2* | 11/2008 | Watanabe | G06F 3/0607 707/999.202 |
| 7,814,273 | B2* | 10/2010 | Barrall | G06F 3/0607 711/114 |
| 2003/0105923 | A1* | 6/2003 | Bak | G06F 3/0607 711/114 |
| 2004/0037120 | A1 | 2/2004 | Uysal et al. | |
| 2004/0049643 | A1 | 3/2004 | Alavarez et al. | |
| 2005/0086559 | A1 | 4/2005 | Uysal et al. | |
| 2005/0268062 | A1 | 12/2005 | Nagase et al. | |
| 2008/0109601 | A1* | 5/2008 | Klemm | G06F 3/0608 711/114 |
| 2010/0115198 | A1* | 5/2010 | Jess | G06F 3/0611 711/114 |
| 2014/0325146 | A1* | 10/2014 | Madhusudana | G06F 3/0689 711/114 |

OTHER PUBLICATIONS

Patterson, David A. et al., "A Case for Redundant Arrays of Inexpensive Disks (RAID)", ACM, 1988, pp. 109-116.
Alvarez, Guillermo A. et al., "Tolerating Multiple Failures in RAID Architectures with Optimal Storage and Uniform Declustering", ACM, 1997, pp. 62-72.
Gibson, Tim LT. Colonel et al., "Long-Term File Activity and Inter-Reference Patterns", 24th Annual International Conference on Computer Measurement and Performance, 1998, pp. 976-987.
Cortes, T. et al., "A Case for Heterogeneous Disk Arrays", 1st IEEE International Conference on Cluster Computing, 2000, pp. 1-7.
Roselli, Drew et al., "A Comparison of File System Workloads", Proceedings of 2000 USENIX Annual Technical Conference, Jun. 18-23, 2000, 15 pages.
Zimmerman, Roger et al., "HERA: Heterogeneous Extension of Raid", Proceedings of the 2000 International Conference on Parallel and Distributed Processing Techniques and Applications, 2000, pp. 1-7.
Colarelli, Dennis et al., "Massive Arrays of Idle Disks for Storage Archives", IEEE, 2002, pp. 1-11.
Anvin, H. Peter, "The Mathematics of RAID-6", Jan. 2004, 9 pages.
Flouris, Michail D. et al., "Violin: A Framework for Extensible Block-Level Storage", Proceedings of the 22nd IEEE/13th NASA Goddard Conference on Mass Storage Systems and Technologies, 2005, 15 pages.
Gonzalez, J.L. et al., Adaptive Data Block Placement Based on Deterministic Zones (AdaptiveZ), OTM, 2007, pp. 1214-1232, Part II.
Liu, Yan et al., "A Data Layout Method in Heterogeneous RAID", IEEE, 2009, pp. 218-225.
Wu, Suzhen et al., "JOR: A Journal-Guided Reconstruction Optimization for RAID-Structured Storage Systems", CSE Conference and Workshop Papers, 2009, 10 pgs.
Jin, Chao et al., "P-Code: A New RAID-6 Code with Optimal Properties", CSE Conference and Workshop Papers, 2009, 11 pages.
Kadav, Asim et al., "Differential RAID: Rethinking RAID for SSD Reliability", 2010, 5 pages.
Wan, Jiguang et al., "S2-RAID: A New RAID Architecture for Fast Data Recovery", IEEE, 2010, 9 pages.
Miranda, Alberto et al., "Analyzing Long-Term Access Locality to Find Ways to Improve Distributed Storage Systems", 2011, 10 pages.
Im, Soojun et al., "Flash-Aware RAID Techniques for Dependable and High-Performance Flash Memory SSD", IEEE Transactions on Computers, Jan. 2011, pp. 80-92, vol. 60, No. 1.
Ren, Jin et al., "I-CASH: Intelligently Coupled Array of SSD and HDD", 2011, 12 pages.
Jeremic, Nikolaus et al., "The Pitfalls of Deploying Solid-State Drive RAIDs", ACM, May 30-Jun. 1, 2011, 13 pages.
Chen, Tseng-Yi et al., "CacheRAID: An Efficient Adaptive Write Cache Policy to Conserve RAID Disk Array Energy", IEEE/ACM Fifth International Conference on Utility and Cloud Computing, 2012, 8 pages.
"EMC VNX Virtual Provisioning", White Paper from EMC Corporation, Dec. 2013, 41 pages.
Chen, Ming-Shing et al., "RAIDq: A Software-Friendly, Multiple-Parity RAID", 2013, 5 pages.
Xie, Ping et al., "Balanced P-Code: A RAID-6 Code to Support Highly Balanced I/Os for Disk Arrays", 9th IEEE International Conference on Networking, Architecture and Storage, 2014, 5 pages.
Miranda, Alberto et al., "CRAID: Online RAID Upgrades Using Dynamic Hot Data Reorganization", Proceedings of the 12th USENIX Conference on File and Storage Technologies, Feb. 17-20, 2014, 15 pages.
Thomasian, Alexander, "Disk Arrays with Multiple RAID Levels", ACM Sigarch Computer Architecture News, Dec. 2013, pp. 6-24, vol. 41, No. 5.
Jeremic, Nikolaus et al., "Improving Random Write Performance in Heterogeneous Erasure-Coded Drive Arrays by Offloading Code Block Requests", 2015, pp. 2007-2014.
Ye, Feng et al., "A Regional Popularity-Aware Cache Replacement Algorithm to Improve the Performance and Lifetime of SSD-based Disk Cache", IEEE, 2015, pp. 45-53.

* cited by examiner

REDUNDANT DISK ARRAY STORAGE SYSTEM AND METHOD USING HETEROGENEOUS DISKS AND A LOOKUP TABLE

RELATED APPLICATION

This application claims the benefit of U.S. Provisional Patent Application Ser. No. 62/096,586, filed Dec. 24, 2014, which is hereby incorporated by reference in its entirety.

FIELD OF THE DISCLOSURE

This disclosure relates to the field of electronic data storage devices, and more particularly, to a redundant disk array configuration that optimizes array disk space using heterogeneous disks.

BACKGROUND

RAID (redundant array of independent disks) is a data storage virtualization technology that combines multiple physical disk drive components into a single logical unit for the purposes of data redundancy, performance improvement, or both. Some existing RAID configurations utilize disks having equal physical size. Thus, when a disk in a RAID array fails, it is typically replaced with a similarly sized disk. However, due to advancements in technology, disks are increasing in size and reliability. Therefore, replacement disks may be larger than the disks they are replacing. However, with existing techniques, if a RAID array has disks of unequal size, such arrays are constrained by the size of the smallest disk in the array, and space on larger disks is wasted.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

When a RAID system has been set up with drives of equal size and a disk fails after several years of use, the failed disk can be replaced with another disk of similar capacity. However, it may not be possible or practical to purchase a replacement drive with the same capacity when a newer drive with twice the size is available. One problem with using a larger capacity replacement disk is that, with some existing techniques, the capacity of the replacement disk that exceeds the capacity of the remaining disks in the array will be unusable and therefore wasted.

To that end, disclosed herein are techniques for using heterogeneous disks of dissimilar storage capacities in a redundant disk array, with less wastage of available storage capacity. Furthermore, such techniques can be used to support growing the file-system while it is on-line. Embodiments of this disclosure further include techniques for increasing the total storage capacity of a redundant disk array with the addition of another disk and graceful degradation of total space in the event of a disk failure. Numerous configurations and variations will be apparent in view of the present disclosure.

Generally, a redundant disk array in accordance with an embodiment removes the predictability of where a block of data is stored on the physical disk. This comes at the cost of having to store a lookup table, but in relation to the size of storage that is available this cost is negligible. The benefits of this include having a variable sized partition. The graceful degradation feature of this system allows the redundant disk array to exit from a degraded state by reorganizing the way data is stored on the disks for as long as it is possible to shrink the file-system on top of the array. With this feature, it is possible to lose another disk without catastrophic effects, which is not possible with existing RAID. Existing RAID can only rebuild what has been lost on the missing disk once a new disk has been put in place.

Hard drives are notorious for being sensitive. Since they are mechanical devices, great deal of care must be taken for their use and keeping it operating. Throughout the years, the storage density of drives has been increasing at a rate of 40% per year. Today, more and more data is stored, but the reliability of the drives remains substantially the same. What has changed is the time scale, which is measured by the Mean Time to Failure (MTTF) of a drive. Nowadays having a million hours before failure is typical for a drive, while 20 years ago it was about ten thousand hours. So not only are drives getting denser, but they are failing with less frequency. This is a good thing, but the failure rate isn't keeping up with the rate the capacity increases.

Figure 1:
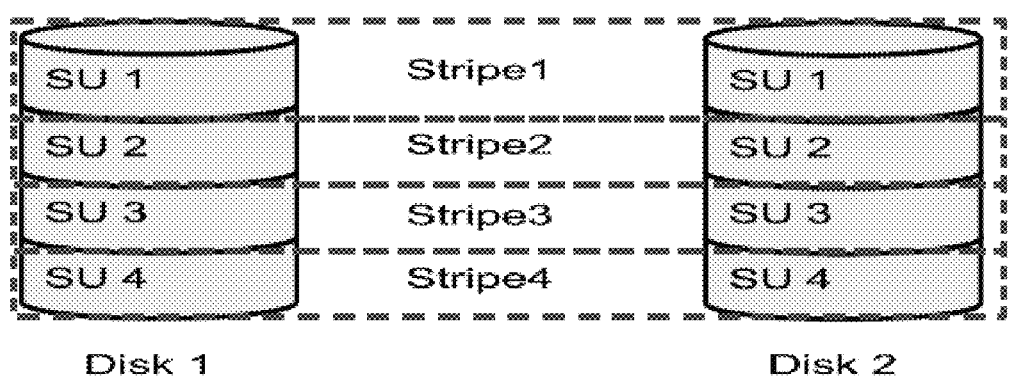
FIG. 1 shows an example RAID array.

Some methods exist for combining the MTTF of multiple disks to decrease the likelihood of data loss, as well as speed up input/output (I/O) operations, by combining the speed of drives together. This is generally referred to as Redundant Arrays of Inexpensive Disks (RAID). Most RAID concepts and techniques rely on the fact that all disks are identical (e.g., the disks have identical capacities). In some existing RAID configurations, each disk is split up into stripe units. The stripe units are generally based on the block size of a disk. Stripe units (e.g., SU1, SU2, SU3, SU4, etc.) are logical units of storage that share the same logical location across different disks and are grouped into a stripe (e.g., Stripe1, Stripe2, Stripe3, Stripe4, etc.), as shown in FIG. 1. For example, as shown in FIG. 1, Stripe1 includes SU1 on both Disk 1 and Disk 2. Depending on the number of disks in the array, it is possible to achieve certain so-called RAID levels. The simplest level is RAID0 and RAID1 also known as striping and mirroring respectively. This is the simplest kind of RAID that can be implemented with as little as two drives. More advanced RAID levels are ones like RAID5 (single parity) and RAID6 (double parity). Parity refers to how redundant the algorithm is which determines how many disks can die before data loss occurs.

For some time, it has been understood that all disks in a redundant array are of the same size, or if different sizes are used, the total usable space is limited by the size of the smallest disk, with the excess capacity going to waste. This causes inefficient disk usage and causes problems when a disk in an array needs to be replaced, as the same model or size disk may not be available. A different layout scheme on heterogeneous disks can be used where the array uses a RAID5 topology until a disk fills up, then the remaining disks are used to continue allocating stripes of a RAID until all disks are full. However, this creates a complicated mechanism where a pseudo stripe pattern must be stored, where each stripe unit on the disk is located using a complex computation. In contrast to such existing techniques, a redundant disk array in accordance with an embodiment is a novel solution to using heterogeneous disks where logical restrictions on where a stripe unit is located are removed, while keeping the logical block mapping an O(1) problem.

According to an embodiment, a redundant disk array utilizes the concept of chunking. The array works by creating groupings of sequential logical blocks on a disk, called chunks, instead of stripe units. A stripe is then made up of chunks, but in accordance with an embodiment, instead of stripes being at a predictable location on each disk, a stripe may be scattered at different locations throughout the array. For example, if there are two disks with two equally sized and similarly located chunks on each disk, a given stripe may include the first chunk on the first disk and the second chunk on the second disk. Each chunk in a stripe has related chunks stored on another disk in an arbitrary location to ensure that if a disk fails, the failure does not destroy more than one chunk in one stripe. Chunks can be paired anywhere on the disk, whereas stripe units are determined based on physical location. With a redundant disk array in accordance with an embodiment, a lookup table is stored in random access memory (RAM) or another suitable data store. The lookup table is a map between the physical location (e.g., physical disk block) of each disk chunk and the logical location of each disk chunk. The lookup table can be an array whose size is bounded by the number of chunks on the drive, and thus the lookup table can be an O(1) lookup. The size of a chunk may, for example, be 4096 bytes or some multiple of that number as per the standard put forth by IDEMA (International Disk Drive Equipment and Materials Association) which makes that the most efficient size to transfer on today's drives, although other chunk sizes are possible. The size of the chunk also determines the amount of RAM that will be used, but having a large chunk size may affect the efficiency at which small fragmented data can be accessed. The smaller chunk size is good for quick access to small files, but a larger chunk size allows for better throughput.

Initialization

Various embodiments can be implemented on any number of types of data storage devices, such as a durable disk storage (which may include any suitable optical or magnetic durable storage device, e.g., RAM, ROM, Flash, USB drive, or other semiconductor-based storage medium), a harddrive, CD-ROM, or other computer readable media for storing data. According to an embodiment, to initialize a redundant disk array, a total number of free chunks is calculated for each disk that is being added to the array. Then a chunk from a disk with the largest number of free chunks is placed in the same stripe as another disk with the next largest number of free chunks. Once the stripe has been allocated, all the chunks in the stripe are marked as used. This process continues until the number of disks in the array with available chunks is zero or one less than the total number of chunks in a stripe (call this CS). There will be at most CS—1 free chunks because if CS disks have chunks available, then those disks can be added and used to store chunks. The initialization function takes in the startCID value (which is the starting chunk ID) because the function itself is generic enough to be used at times when data in the redundant disk array is being reshuffled.

It will be understood that, in accordance with some embodiments, each disk may not necessarily contain a chunk of every stripe. Generally, the only time that each disk will contain a chunk of every stripe is when CS is equivalent to the number of disks in the array. This property becomes useful when trying to access multiple stripes at the same time. For example, in some embodiments, the access time may be decreased by spreading the load across all the disks. For example, referring to the example of FIG. 2, assume all disks are empty and that an underlying redundant array that only requires two disks is requested. For the sake of simplicity, a RAID1 level (mirroring) is described below.

According to an embodiment, a disk array can be initialized using the following example algorithm. DFC is the number of disks with free chunks; CS is the number of chunks in a stripe; allDisks is the set containing the disks in the array.

---

Algorithm 1

---

```
Procedure: initRAID(allDisks, CS, startCID)
    CID = startCID
    DFC = getDisksWithFreeChunks(allDisks)
    while(DFC > CS)
        curStripe = { }
        validDisks = allDisks
        for i = 1:CS
            curDisk = mostChunksFree(validDisks)
            curStripe = curStripe ∪ curDisk
            validDisks = validDisks − curDisk
            if(chunksFree(curDisk) = = 1)
                DFC = DFC − 1
            endif
        endfor
        allocStripe(curStripe, CID)
        CID = CID + 1
    endwhile
```

---

Figure 2:
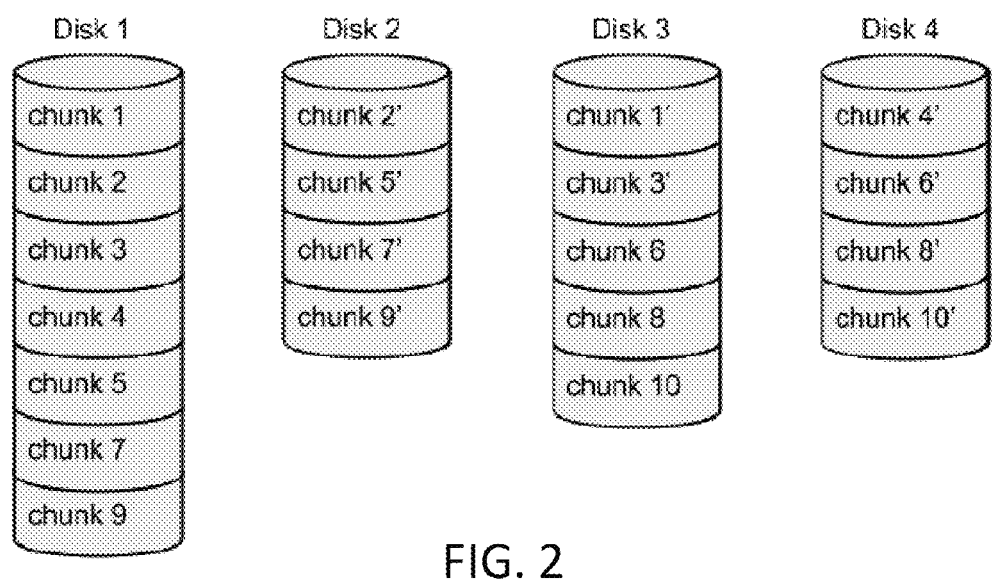
FIG. 2 shows an example redundant disk array with two-disk redundancy, in accordance with an embodiment of the present disclosure.

Using Algorithm 1, it can be calculated that, as shown in the example of FIG. 2, Disk 1 has the greatest number of free chunks (seven), followed by Disk 3 (five), then Disks 2 and 4 (four chunks each). In the first iteration, the first free chunk of Disk 1 (chunk 1) is allocated to CID=1 with a mirror on Disk 3 (chunk 1'). Chunk 1 and chunk 1' are included in the first stripe. After allocating chunk 1 and chunk 1' to the first stripe, Disk 1 has the greatest number of free chunks (six), and the remaining three disks have the same amount (four chunks each). Thus, CID=2 can be allocated onto Disk 1 (chunmk 2), and Disk 2 can be arbitrarily chosen as the mirror to Disk 1 (chunk 2'). After allocating chunk 2 and chunk 2' to the second stripe, Disk 1 still has the greatest number of free chunks (five), so it is chosen, and Disk 3 is arbitrarily chosen from the set containing Disk 3 and 4 (four chunks each). The process continues until there are no longer any available disks to mirror across, which in this case is at most one. In an alternative embodiment, it is possible to use an algorithm that instead takes a disk with the greatest number of free chunks and another disk with the fewest number of free chunks and assigns those disks to a stripe. Other such algorithms will be apparent in light of this disclosure.

With homogeneous disks, some embodiments use the same number of disks as there are disks in total. One advantage of this configuration is to make use of the extra space left over on larger disks in a redundant fashion. Another advantage is that when a disk dies, if the amount of data stored on the array would fit in the now smaller array, the system can reorganize the chunks so that the data is all redundant and the system is able to suffer the loss of another drive. Having this type of redundancy allows for the MTTF to be rather large, much larger than any existing kind of RAID. This is because without the need for spare disks, the disk array can repair itself into a redundant state as long as the array is not completely full with data. In some embodiments, it is possible to keep track of which disks are members of a particular disk array. This is useful for at least two purposes:

1. Detection of redundant array groups from a pool of disks; and
2. Detection of disks missing from the redundant array.

With respect to system initialization, Point 1 is useful for grouping the disks into their respective redundant array sets from a collection of disks. Point 2 is useful when a drive is removed and the redundant array is being rebuilt.

Figure 3:
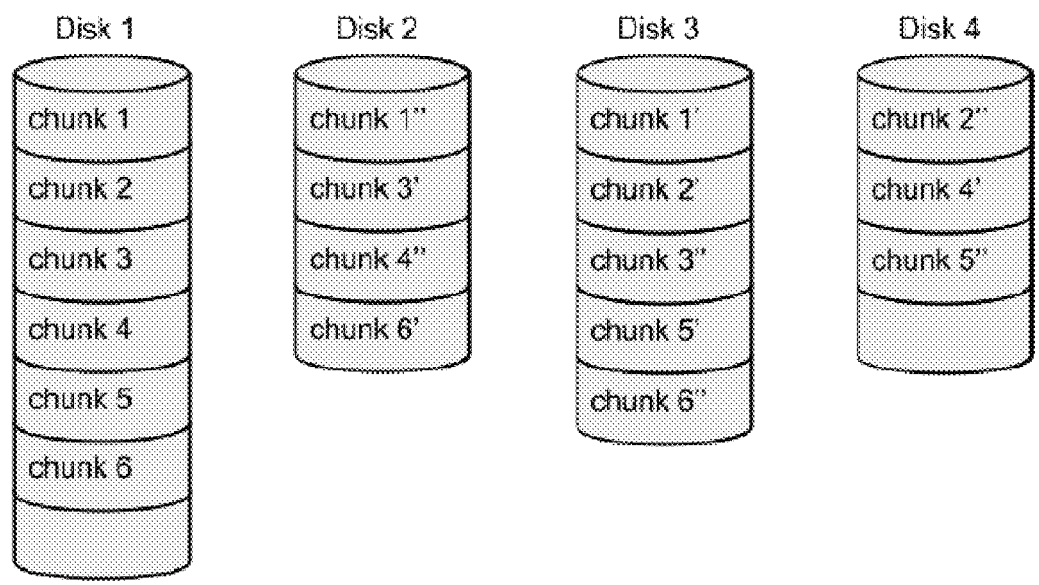
FIG. 3 shows an example redundant disk array with three-disk redundancy, in accordance with an embodiment of the present disclosure.

According to an embodiment, the techniques variously described in this disclosure are also well suited for having more than two blocks in one chunk. For example, if the underlying redundant array is similar to RAID5, then, as shown in the example of FIG. 3, a different data layout can be realized with the same set of disks as before in FIG. 2. Since in this example there are 20 chunks available, which is not evenly divisible by three, the remainder chunks will be unused. Even still, two extra stripes are gained in comparison to some existing techniques that are unable to utilize the additional disk capacity. Adding in an additional disk with a single chunk allows for full utilization of all disks. Similarly, any disk with a size calculated using Equation 1 (where $n \geq 0$) can be used to expand the array to full utilization.

$$diskSize = missingChunkCount + n*CS \qquad \text{Eq. (1)}$$

Another advantage of a redundant disk array in accordance with an embodiment is that the data access algorithms can be much different than those of existing RAID. Assume, for example, that we want to read the data in stripe 4 from the disk array in FIG. 3. The optimization can be changed based on whether it is faster to compute the XOR (exclusive-OR) of the last chunk or to wait for the disk to read it. It will be understood that the heads of each disk are in a relatively random configuration (compared to that of existing RAID), therefore a shortest path optimization of which disk is best suited to read which chunk can be performed, since it is possible to keep track of what chunk each disk last read. This can, as a byproduct, reduce wear on the disk as well as energy usage.

According to an embodiment, a disk can be added to a redundant disk array using the following example algorithm. RaidDisks is the set containing the existing disks in the array, with maxCID being the largest Chunk ID.

Algorithm 2

Procedure: addDisk(raidDisks, maxCID, CS, newDisk)
  curCID = maxCID
  for i = 1:floor(chunksFree(newDisk) / CS)*CS -continued Algorithm 2 validDisks = containsCID(allDisks, curCID)
    curDisk = leastChunksFree(validDisks)
    reallocChunk(newDisk, curDisk, curCID)
    curCID = curCID − 1
  endfor
  initRAID(raidDisks ∪ newDisk, CS, maxCID + 1)

The redundant disk array can enter a degraded state when a disk has become inaccessible for any number of reasons (e.g., a hardware failure). There will be degradation events such as when a disk fails or when a new disk is added. In accordance with an embodiment, such degradation events represent an opportunity to reshuffle chunks. Generally, it is desirable to have chunks in long sequences stored on the disks to optimize large reads. However, non-sequential reads can be sped up by having the chunks scattered on several disks.

When a disk is removed from the array for any reason, the redundant disk array is in a degraded state. A redundant disk array in accordance with an embodiment has the ability to discard some unused stripes and reallocate the newly freed chunks to those stripes that have lost a chunk because of the missing disk. Once the process is completed, the array is once again fully redundant and can suffer the loss of an additional disk. This technique is called graceful degradation. It is not necessary to perform a graceful degradation when a new disk is standing by to be added. When a removed disk is added back in, it can be checked for consistency. This consistency check is different from rebuilding an existing RAID because only those stripes which are on the newly connected disk may be checked. Fixing a degraded array has a smaller amount of time needed for rebuilding than for an existing RAID, because the original disks in the array will be also written to while the chunks are being reorganized. Therefore, it is more of a parallel process compared to when an existing RAID is being rebuilt and a single disk is being written to.

In an embodiment, when the redundant disk array is in a degraded state, the partitions on the available disks can be dynamically resized based on the availability of the disks. For example, the file system may be resized to fit the disks remaining in the array. Then, the chunks may be reallocated to different stripes so that the array is once again fully operational and can survive another disk failure. This procedure may be performed automatically, although not necessarily so.

Adding a Disk

Figure 4:
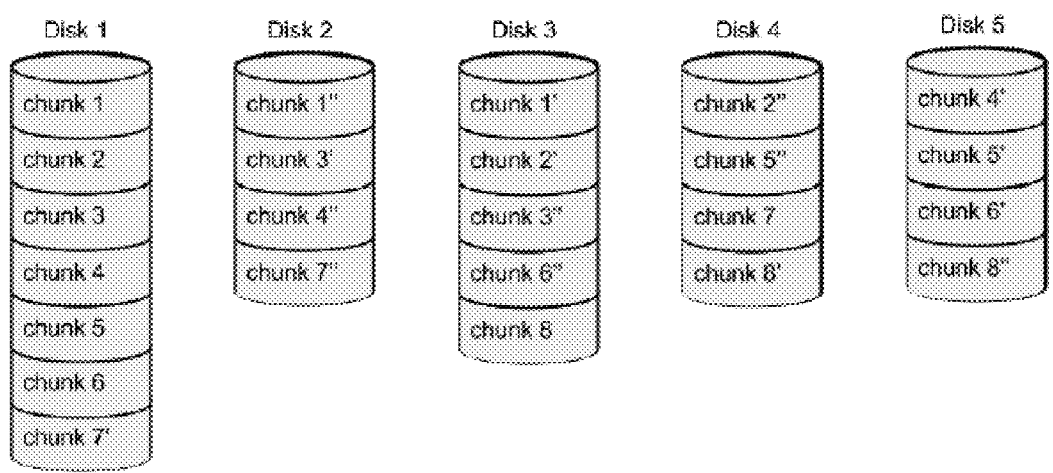
FIG. 4 shows an example redundant disk array during addition of a new disk to the array, in accordance with an embodiment of the present disclosure.

When a new disk is added to the array, the number of chunks available on the disk is determined, taking only whole divisors of CS number of chunks and copying chunks from other disks in the array to the new disk. This will free up chunks on the other disks which can be allocated into new stripes. The chunk with largest ID is taken from the disk that is the most full, and continuing numerically down by chunk ID until all the chunks have been transferred. On the new disk, these chunks are placed in increasing order to help with sequential reads. This technique preserves sequences on disks. In some cases, chunks can be shifted down to fill in any gaps. The last step is to fill in the now empty chunks using the same algorithm as in the initialization. FIG. 4 shows an example of the final result of such a restructuring. When a new disk is added to the array, the amount of space available is increased. With certain file systems, it is possible to increase the available space on the file system in-situ. An example of such a file-system is EXT3/4.

Removing a Disk

In the event that a disk is removed from the array due to hardware failure or otherwise, the array enters a degraded state. The first task is to resize the file-system such as described above. The size of the reduction depends on the resulting size of the array after the redundant disk array is rebuilt. This can be calculated by taking the number of chunks that were lost and dividing by the number of chunks in the stripe rounding up, which indicates how many stripes were lost.

According to an embodiment, a disk can be removed from a redundant disk array using the following example algorithm.

---
Algorithm 3
---
```
Procedure: delDisk(raidDisks, maxCID, CS, selDisk)
    usedStripes = ceil(numUsedChunks(selDisk) / CS)*CS
    shrinkByStripe(raidDisks, usedStripes)
    maxCID = maxCID - usedStripes
    for i = 1:numUsedChunks(selDisk)
        curCID = getCID(selDisk, i)
        validDisks = raidDisks - containsCID(raidDisks,curCID)
        destDisk = mostChunksFree(validDisks)
        reallocChunk(destDisk, selDisk, curCID)
    endfor
```
---

Figure 5:
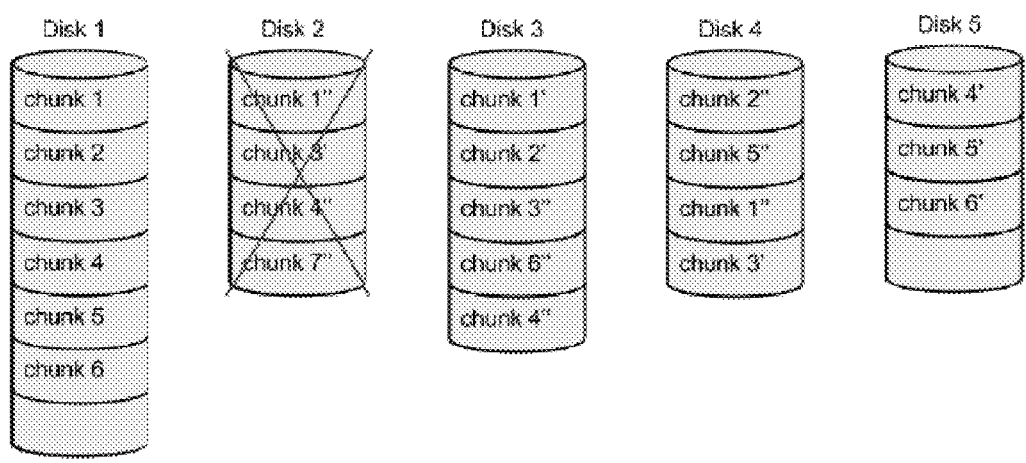
FIG. 5 shows an example redundant disk array during removal of a disk from the array, in accordance with an embodiment of the present disclosure.

When the data is condensed onto the remaining chunks as a result of the file-system resizing, the higher numbered chunks can be eliminated. The chunks can be shifted down on the disk. As shown in the example of FIG. 5, the shift-down step is omitted and two stripes are removed with the removal of Disk 2. Any disk that stored chunks from those stripes has those particular chunks back on the free chunks pool. The data lost in Disk 2 can be recreated, for example, by taking the XOR of the remaining chunks in each stripe.

Example Computing Device

Figure 6:
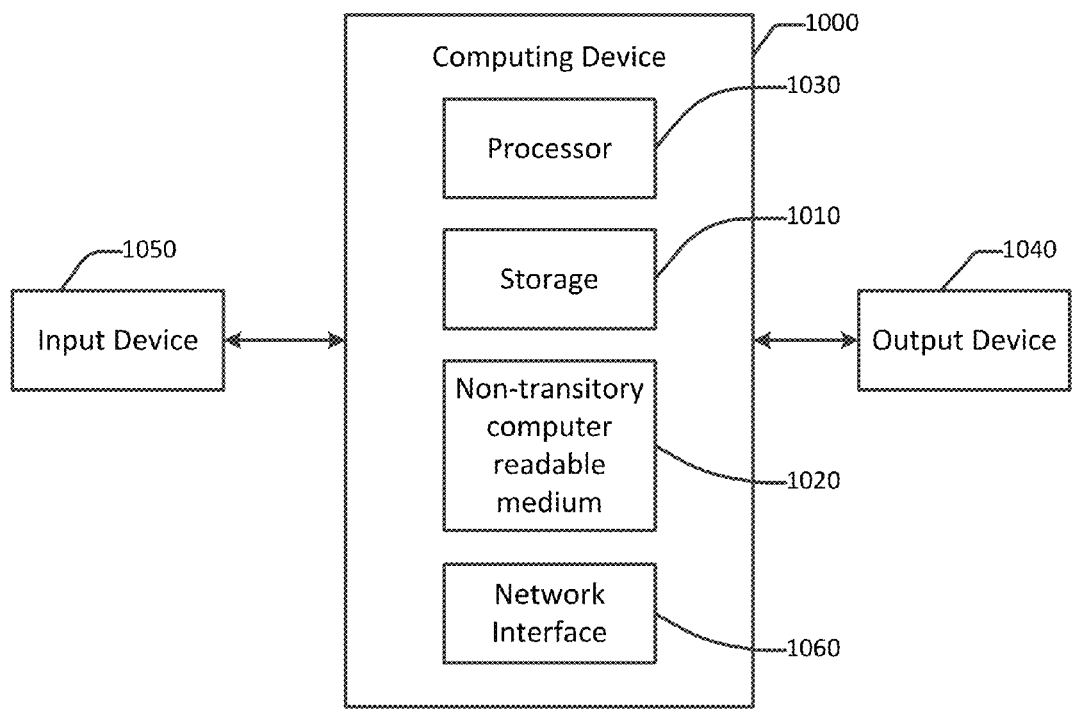
FIG. 6 is a block diagram representing an example computing device that may be used in accordance with an embodiment of the present disclosure.

FIG. 6 is a block diagram representing an example computing device 1000 that may be used to perform any of the techniques as variously described in this disclosure. For example, Algorithms 1, 2, 3, or any combination of these, may be implemented in the computing device 1000. The computing device 1000 may be any computer system, such as a workstation, desktop computer, server, laptop, handheld computer, tablet computer (e.g., an iPad™ tablet computer), mobile computing or communication device (e.g., an iPhone™ mobile communication device, an Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more data storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. FIGS. 1-5 show examples of such data storage devices 1010 in several combinations and configurations, according to various embodiments. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may also include a network interface 1060. The computing device 1000 may include other suitable conventional I/O peripherals such as a camera. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the UNIX® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., field programmable gate array (FPGA)) or a purpose-built semiconductor (e.g., application specific integrated circuit (ASIC)). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, various modules and components can be implemented in software, such as a set of instructions (e.g., HMTL, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. As used in this disclosure, the terms "non-transient" and "non-transitory" exclude transitory forms of signal transmission. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Example Methodologies

Figure 7A:
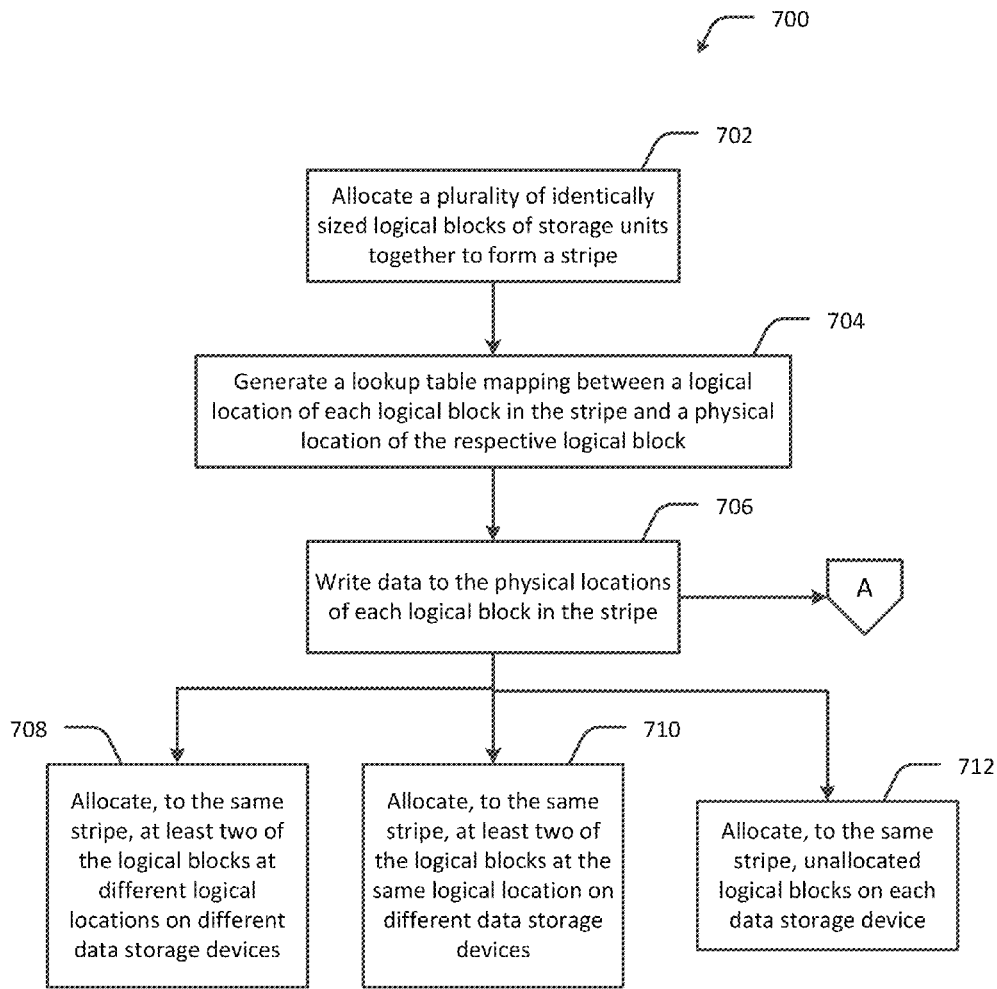
FIGS. 7A, 7B and 7C are flow diagrams representing example methods for a redundant disk array configuration that optimizes array disk space using heterogeneous disks, in accordance with several embodiments of the present disclosure.
Figure 7B:
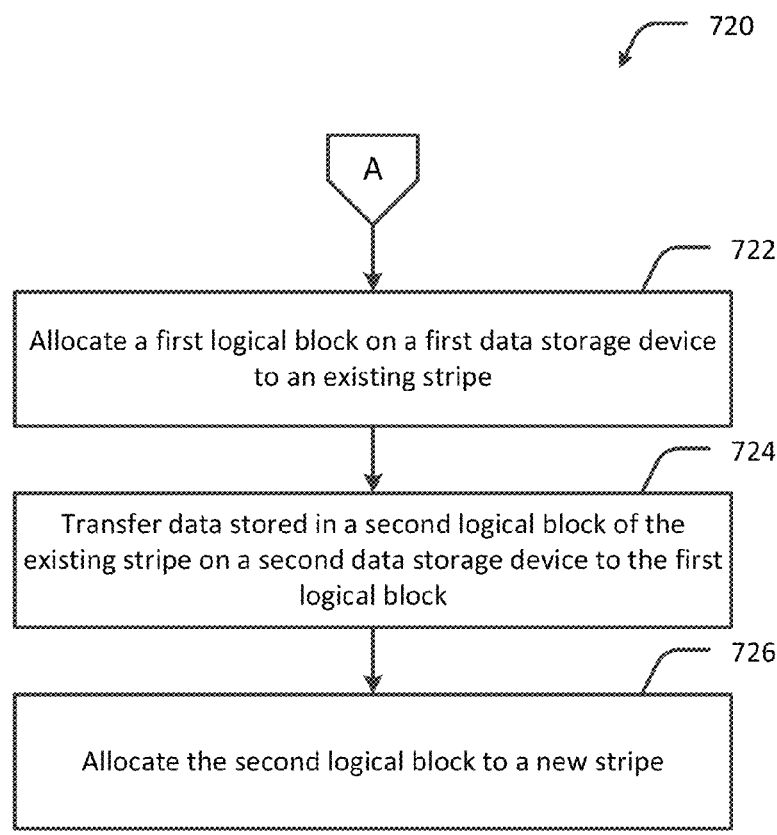
Figure 7C:
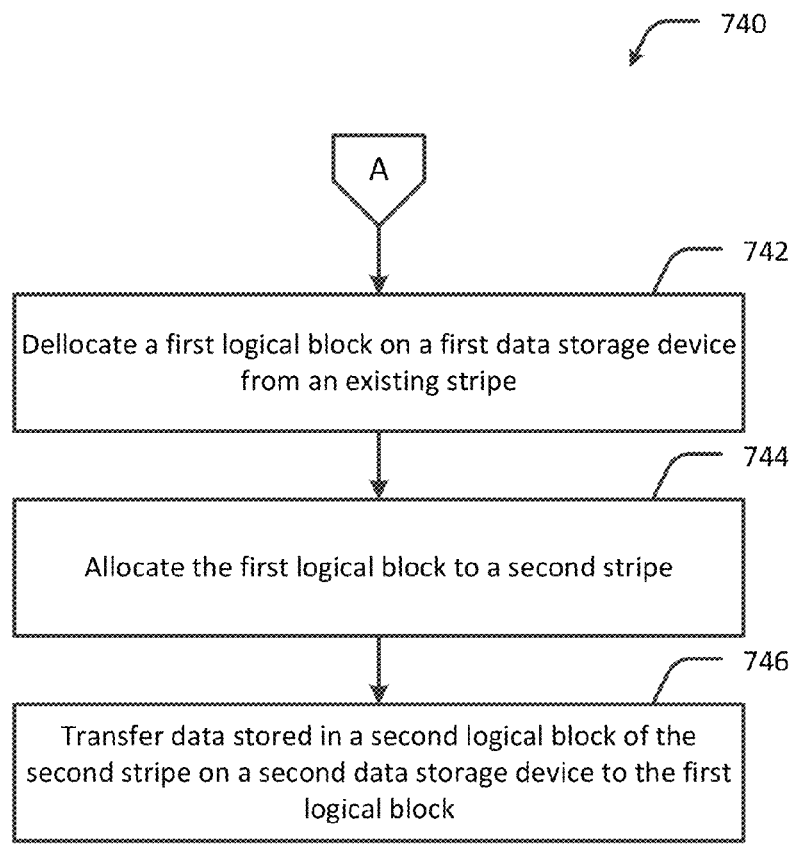

FIGS. 7A, 7B and 7C are flow diagrams representing example methods 700, 720, 740 for a redundant disk array configuration that optimizes array disk space using heterogeneous disks, in accordance with several embodiments. The methods 700, 720, 740 may be implemented, for example, in the computing device 1000 of FIG. 6. According to an embodiment, the method 700 of FIG. 7A provides a computer-implemented method, including allocating in step 702 a plurality of identically sized logical blocks of storage units together to form a stripe on each of a plurality of data storage devices. At least two of the logical blocks in the stripe can be located on different data storage devices. The method 700 further includes generating in step 704 a lookup table representing a mapping between a logical location of each logical block in the stripe and a physical location of the respective logical block on the corresponding data storage device, and writing in step 706 data to the physical locations of each logical block in the stripe, the physical locations being obtained from the lookup table. In some embodiments, at least two of the data storage devices are heterogeneous, and at least two of the data storage devices have a different total number of logical blocks. In some other embodiments, at least two of the data storage devices are homogeneous, and at least two of the data storage devices have the same total number of logical blocks. In some such embodiments, at least one of the data storage devices has a different total number of logical blocks. In some embodiments, the method 700 includes allocating in step 708, to the same stripe, at least two of the logical blocks at different logical locations on different data storage devices. In some other embodiments, the method 700 includes allocating in step 710, to the same stripe, at least two of the logical blocks at the same logical location on different data storage devices. In some embodiments, a first one of the data storage devices has a greatest number of logical blocks that are not allocated to any stripe among all of the data storage devices, and a second one of the data storage devices has a fewer number of logical blocks that are not allocated to any stripe among all of the data storage devices than the number of logical blocks that are not allocated to any stripe on the first data storage device. In some such embodiments, the method 700 includes allocating in step 712, to the same stripe, unallocated logical blocks on each of the first and second ones of the data storage devices.

In some embodiments, the method 700 includes the method 720 of FIG. 7B. The method 720 includes allocating in step 722 a first logical block on a first data storage device to an existing stripe, transferring in step 724 data stored in a second logical block of the existing stripe on a second data storage device to the first logical block, and allocating in step 726 the second logical block to a new stripe.

In some embodiments, the method 700 includes the method 740 of FIG. 7C. The method 740 includes deallocating in step 742 a first logical block on a first data storage device from an existing stripe (a first stripe), allocating in step 744 the first logical block to a second stripe, and transferring in step 746 data stored in a second logical block of the second stripe on a second data storage device to the first logical block.

Numerous embodiments will be apparent in light of the present disclosure, and features described in this disclosure can be combined in any number of configurations. For example, one embodiment provides a system including a storage and a computer processor operatively coupled to the storage. The computer processor is configured to execute instructions stored in the storage that when executed cause the computer processor to carry out a process. The process includes allocating a plurality of identically sized logical blocks of storage units together to form a stripe on each of a plurality of data storage devices, where at least two of the logical blocks in the stripe are located on different data storage devices. The process further includes generating a lookup table representing a mapping between the logical location of each logical block in the stripe and a physical location of the respective logical block on the corresponding data storage device, and writing data to the physical locations of each logical block in the stripe, the physical locations being obtained from the lookup table. In some cases, at least two of the data storage devices are heterogeneous, and at least two of the data storage devices have a different total number of logical blocks. In some cases, at least two of the data storage devices are homogeneous, and at least two of the data storage devices have a same total number of logical blocks. In some such cases, at least one of the data storage devices has a different total number of logical blocks. In some cases, at least two of the logical blocks in the same stripe are at different logical locations on different ones of the data storage devices. In some cases, at least two of the logical blocks in the same stripe are at the same logical location on different ones of the data storage devices. In some cases, a first one of the data storage devices has a greatest number of logical blocks that are not allocated to any stripe among all of the data storage devices, a second one of the data storage devices has a fewer number of logical blocks that are not allocated to any stripe among all of the data storage devices than the number of logical blocks that are not allocated to any stripe on the first data storage device, and at least two logical blocks in the same stripe are allocated from unallocated logical blocks on each of the first and second ones of the data storage devices. In some cases, the process includes allocating a first logical block on a first data storage device to an existing stripe, transferring data stored in a second logical block of the existing stripe on a second data storage device to the first logical block, and allocating the second logical block to a new stripe. In some cases, the process includes deallocating a first logical block on a first data storage device from a first stripe, allocating the first logical block to a second stripe, and transferring data stored in a second logical block of the second stripe on a second data storage device to the first logical block. Another example embodiment provides a non-transitory computer program product having instructions encoded thereon that when executed by one or more processors cause the process as variously described in this paragraph to be carried out.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
allocating, by a processor, a plurality of identically sized logical blocks of storage units together to form a stripe across a plurality of data storage devices, at least two of the logical blocks in the stripe being located on different data storage devices;
generating, by the processor, a lookup table representing a mapping between a logical location of each logical block in the stripe and a physical location of the respective logical block on the corresponding data storage device; and
writing, by the processor, data to the physical locations of the logical blocks in the stripe, the physical locations of the logical blocks being obtained from the lookup table,
wherein a first one of the data storage devices has a greatest number of logical blocks that are not allocated to any stripe among all of the data storage devices;
wherein a second one of the data storage devices has a fewer number of logical blocks that are not allocated to any stripe among all of the data storage devices than the number of logical blocks that are not allocated to any stripe on the first data storage device; and
wherein the method further comprises allocating, by the processor to the same stripe, unallocated logical blocks on each of the first and second ones of the data storage devices.

2. The method of claim 1, wherein at least two of the data storage devices are heterogeneous and have a different total number of logical blocks.

3. The method of claim 1, wherein at least two of the data storage devices are homogeneous and have the same total number of logical blocks.

4. The method of claim 3, wherein at least one of the data storage devices has a different total number of logical blocks than another one of the data storage devices.

5. The method of claim 1, further comprising allocating, by the processor to the same stripe, at least two of the logical blocks at different logical locations on different ones of the data storage devices.

6. The method of claim 1, further comprising allocating, by the processor to the same stripe, at least two of the logical blocks at the same logical location on different ones of the data storage devices.

7. The method of claim 1, further comprising:
allocating, by the processor, a first logical block on a first data storage device to an existing stripe;
transferring, by the processor, data stored in a second logical block of the existing stripe on a second data storage device to the first logical block; and
allocating, by the processor, the second logical block to a new stripe.

8. The method of claim 1, further comprising:
deallocating, by the processor, a first logical block on a first data storage device from a first stripe;
allocating, by the processor, the first logical block to a second stripe; and
transferring, by the processor, data stored in a second logical block of the second stripe on a second data storage device to the first logical block.

9. A system comprising:
a storage; and
a computer processor operatively coupled to the storage, the computer processor configured to execute instructions stored in the storage that when executed cause the computer processor to carry out a process comprising:
allocating a plurality of identically sized logical blocks of storage units together to form a stripe across plurality of data storage devices, at least two of the logical blocks in the stripe being located on different data storage devices;
generating a lookup table representing a mapping between a logical location of each logical block in the stripe and a physical location of the respective logical block on the corresponding data storage device; and
writing data to the physical locations of the logical blocks in the stripe, the physical locations of the logical blocks being obtained from the lookup table,
wherein a first one of the data storage devices has a greatest number of logical blocks that are not allocated to any stripe among all of the data storage devices;
wherein a second one of the data storage devices has a fewer number of logical blocks that are not allocated to any stripe among all of the data storage devices than the number of logical blocks that are not allocated to any stripe on the first data storage device; and
wherein at least two logical blocks that are allocated to the same stripe are allocated from unallocated logical blocks on each of the first and second ones of the data storage devices.

10. The system of claim 9, wherein at least two of the data storage devices are heterogeneous and have a different total number of logical blocks.

11. The system of claim 9, wherein at least two of the data storage devices are homogeneous and have the same total number of logical blocks.

12. The system of claim 11, wherein at least one of the data storage devices has a different total number of logical blocks than another one of the data storage devices.

13. The system of claim 9, wherein at least two of the logical blocks that are allocated to the same stripe are at different logical locations on different ones of the data storage devices.

14. The system of claim 9, wherein at least two of the logical blocks that are allocated to the same stripe are at the same logical location on different ones of the data storage devices.

15. The system of claim 9, wherein the process includes:
allocating a first logical block on a first data storage device to an existing stripe;

transferring data stored in a second logical block of the existing stripe on a second data storage device to the first logical block; and allocating the second logical block to a new stripe.

16. The system of claim 9, wherein the process includes:

deallocating a first logical block on a first data storage device from a first stripe;

allocating the first logical block to a second stripe; and transferring data stored in a second logical block of the second stripe on a second data storage device to the first logical block.

17. A non-transitory computer readable storage medium having instructions encoded thereon that when executed by one or more processors cause a process to be carried out, the process comprising:

allocating a plurality of identically sized logical blocks of storage units together to form a stripe across a plurality of data storage devices, at least two of the data storage devices having a different total number of logical blocks, at least two of the logical blocks in the stripe being located on different data storage devices;

generating a lookup table representing a mapping between a logical location of each logical block in the stripe and a physical location of the respective logical block on the corresponding data storage device; and writing data to the physical locations of the logical blocks in the stripe, the physical locations of the logical blocks being obtained from the lookup table, wherein a first one of the data storage devices has a greatest number of logical blocks that are not allocated to any stripe among all of the data storage devices;

wherein a second one of the data storage devices has a fewer number of logical blocks that are not allocated to any stripe among all of the data storage devices than the number of logical blocks that are not allocated to any stripe on the first data storage device; and wherein at least two logical blocks that are allocated to the same stripe are allocated from unallocated logical blocks on each of the first and second ones of the data storage devices.

18. The non-transitory computer readable storage medium of claim 17, wherein at least two of the logical blocks that are allocated to the same stripe are at different logical locations on different ones of the data storage devices.

19. The non-transitory computer readable storage medium of claim 17, wherein the process includes:

allocating a first logical block on a first data storage device to an existing stripe;

transferring data stored in a second logical block of the existing stripe on a second data storage device to the first logical block; and allocating the second logical block to a new stripe.

20. The non-transitory computer readable storage medium of claim 17, wherein the process includes:

deallocating a first logical block on a first data storage device from a first stripe;

allocating the first logical block to a second stripe; and transferring data stored in a second logical block of the second stripe on a second data storage device to the first logical block.

* * * * *